United States Patent [19]

Pacht

[11] Patent Number: 4,620,562

[45] Date of Patent: Nov. 4, 1986

[54] HIGH PRESSURE REGULATOR VALVE

[75] Inventor: Amos Pacht, Houston, Tex.

[73] Assignee: Butterworth, Inc., Houston, Tex.

[21] Appl. No.: 663,811

[22] Filed: Oct. 19, 1984

Related U.S. Application Data

[63] Continuation of Ser. No. 425,521, Sep. 28, 1982, abandoned.

[51] Int. Cl.⁴ .............................................. F16K 43/00
[52] U.S. Cl. .................... 137/315; 137/328; 137/509; 137/528; 137/529; 92/169
[58] Field of Search ............... 137/509, 510, 528, 529, 137/327, 328, 315; 92/134, 169, 171; 251/363

[56]  References Cited

U.S. PATENT DOCUMENTS

| | | | |
|---|---|---|---|
| 2,059,759 | 11/1936 | Stearns | 137/509 |
| 2,261,365 | 11/1941 | Grove | 137/510 |
| 2,750,957 | 6/1956 | Tavola | 137/510 |
| 3,054,422 | 9/1962 | Napolitano | 137/509 |
| 3,217,742 | 11/1965 | Merrill | 137/509 |
| 3,509,795 | 5/1970 | Woodward | 92/134 |
| 4,073,469 | 2/1978 | Kodric | 137/509 X |
| 4,135,546 | 1/1979 | Morrison | 137/315 |
| 4,280,326 | 7/1981 | Moodie | 92/134 |
| 4,412,555 | 11/1983 | Combes | 137/528 X |

FOREIGN PATENT DOCUMENTS 27227 4/1981 European Pat. Off. ............ 137/508

Primary Examiner—Harold W. Weakley
Attorney, Agent, or Firm—Hubbard, Thurman, Turner & Tucker

[57]  ABSTRACT

A pressure regulating valve for controlling pressure in high pressure hydraulic circuits includes a closure member with an integral control piston and a conical seating surface cooperable with a complementary surface on a seat member. The valve closure member is biased in the closed position by an actuating mechanism including a pressure gas piston and cylinder arrangement utilizing a flexible diaphragm for sealing the actuator pressure chamber. The effective cross-sectional area of the control piston is large enough to minimize the differences in cross-sectional areas on the closure member exposed to pressure fluid between the valve closed and valve open positions whereby a minimum variation between the valve opening pressure and the control pressure is experienced. The increase in pressure in the actuator pressure chamber resulting from movement of the valve from the closed to open positions substantially offsets the change in effective face areas of the closure member to further minimize the difference between the valve opening pressure and the steady state regulated pressure.

10 Claims, 3 Drawing Figures

HIGH PRESSURE REGULATOR VALVE

This application is a continuation of application Ser. No. 425,521, filed Sept. 28, 1982, now abandoned.

BACKGROUND OF THE INVENTION

1. Field of the Invention

The present invention pertains to a pressure regulator valve having a control piston and closure member adapted to minimize the variation between the valve opening pressure and the continuous operating pressure. The valve is particularly adapted for use in conjunction with high pressure liquid jet blasting or cutting apparatus.

2. Background

In the development of high pressure hydraulic apparatus, such as water jet cutting and blast cleaning apparatus and hydrostatic test equipment, operating pressures have now commonly reached values in the range of 10,000 to 50,000 psig. The development of working liquid handling equipment operating in these pressure ranges presents special problems. In certain applications of water jet blast cleaning or cutting equipment, for example, it is desirable to regulate the pump discharge pressure to a substantially constant value regardless of the rate of usage of the pump flow. For example, it may be desired to have several on-off type nozzles or jetting guns connected to a single or common pump discharge line. In such an application it is desirable to provide a pressure regulating valve which will regulate the pump discharge pressure to a substantially constant value so that one or more guns may be properly operated from the same fluid source.

The high operating pressures of liquid jet blast cleaning or cutting equipment requires that the operating components be mechanically strong enough to withstand the operating pressures but also be mechanically simple and adapted for easy replacement of those component parts which are subject to high rates of wear due to the pressure and flow characteristics of the liquid at such operating conditions. Because of the high operating pressures a component such as a pressure regulating valve is particularly difficult to design because of the extremely high actuating forces that must be applied to bias the valve closure member in the closed or controlled position. At the same time the valve must be adapted to operate satisfactorily over a long period of time, be mechanically simple and cost effective and also be particularly adapted for replacement of component parts. These requisites have presented several problems to the art worker.

Prior to the development of the present invention, for example, it has been common to utilize water jet cutting equipment wherein a simple on-off or so-called dump valve is used in conjunction with the jet cleaning guns as in means of flow control. However, the development of a pressure regulating valve as described and claimed herein has been particularly beneficial for such applications and those skilled in the art will recognize that many other applications for the improved valve of the present invention will be appropriate and desirable.

SUMMARY OF THE INVENTION

The present invention provides an improved fluid pressure regulating valve particularly adapted for use in conjunction with high pressure liquid applications such as water jet cutting and blast cleaning equipment and hydrostatic testing equipment. In accordance with one aspect of the present invention there is provided a pressure regulating valve having a closure member, seat configuration, and operating or control piston adapted to minimize the variation between the pressure required to open or unseat the closure member and the regulated or steady state operating pressure of the valve.

In accordance with another aspect of the present invention there is provided an improved pressure regulating valve having a plug type closure member formed with a frusto-conical seating surface engageable with a cooperating seat surface on a seat member wherein the differential areas acted on by the fluid pressure upon opening of the valve are minimized, the valve seat surface area is maximized to reduce erosion due to high velocity flow and there is no tendency for the closure member to jam in the closed position against the seat.

In accordance with yet another aspect of the present invention there is provided a high pressure regulating valve having a control piston for biasing the closure member in the open position which is of sufficiently large effective area subject to pressure fluid upstream of the valve seat that a minimum pressure differential is experienced between the pressure required to open the valve and the steady state regulated or operating pressure of the valve.

The present invention still further provides an improved high pressure regulating valve having a pressure fluid actuator for biasing the valve in the closed position which is of uncomplicated construction, is designed to minimize leakage of the control pressure fluid and includes a pressure fluid chamber volume for an actuating piston which is subject to minimal change over the operating range of the valve so that the change in pressure of the control fluid has minimal effect on the valve operating characteristics. In fact, the valve is adapted to provide a maximum change in volume of the control pressure fluid over the stroke length of the valve closure member which is operable to increase the control fluid pressure sufficiently to counteract the valve opening forces resulting from the change in effective area of the valve closure member when moving from the seated to the unseated position.

In accordance with yet another aspect of the present invention there is provided a valve biasing actuator for a high pressure regulating valve which is adapted to limit the opening movement of the valve closure member, control piston and actuator piston.

The high pressure regulator valve of the present invention is still further characterized by an improved arrangement of the component parts wherein a valve seat member and closure member are easily removable from the valve body for replacement or repair. In particular, the valve closure member and control piston, which are formed as an integral part may be removed from the valve body and replaced without requiring disassembly or bleeding of control pressure fluid from the regulating actuator. The valve body and regulating actuator housing are of mechanically uncomplicated and rugged construction and the valve actuator pressure chamber is easily sealed by an improved cup shaped flexible diaphragm interposed between the actuator piston and the pressure chamber.

Those skilled in the art of pressure regulating valves will recognize the superior features of the present invention as well as other significant aspects thereof upon reading the detailed description which follows in conjunction with the drawings.

DESCRIPTION OF THE PREFERRED EMBODIMENT

Figure 1:
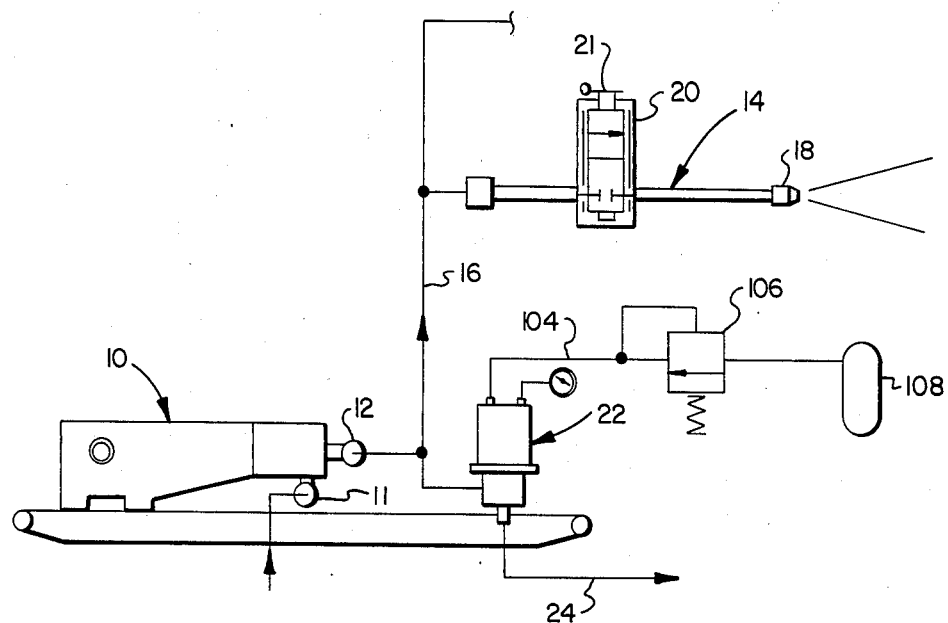
FIG. 1 is a schematic diagram of a hydraulic apparatus comprising a high pressure water jet cutting or blast cleaning unit including the pressure regulating valve of the present invention.

In the description which follows like parts are marked throughout the specification and drawings with the same reference numerals, respectively. The drawings are not necessarily to scale and in certain views schematic representations of some components are presented in the interest of clarity and conciseness.

Referring to FIG. 1, there is illustrated in somewhat schematic form a hydraulic apparatus comprising a high pressure pump, generally designated by the numeral 10, which is adapted to be driven by a prime mover, not shown, for pumping liquid such as water from a source, also not shown, connected to an inlet manifold 11, and for the delivery of said liquid at pressures in the range of at least 10,000 to 20,000 psig at a pump discharge manifold 12. The pump 10 is adapted to be used in conjunction with a high pressure water jet cutting or blast cleaning gun, generally designated by the numeral 14 and which is connected to the pump discharge manifold 12 by way of a flow conduit 16. The jet gun 14 includes a discharge nozzle 18 and an operator actuated shutoff valve 20.

The gun 14 is operable to be actuated to supply a very high velocity stream of water to be used for cutting or blast cleaning in many applications known to those skilled in the art. In particular, the valve 20 is adapted to shutoff upon release of its actuating lever 21 to abruptly interrupt flow of high pressure water through the conduit 16. The apparatus illustrated in FIG. 1 is adapted to be used in conjunction with one or several guns 14 although only one is shown for illustration purposes. Additional jet guns 14 could be used with the apparatus described and illustrated by merely connecting each additional gun to the conduit 16 in a manner readily understandable by those skilled in the art.

The apparatus illustrated in FIG. 1 is adapted to be used in conjunction with an improved high pressure regulating valve according to the present invention and generally designated by the numeral 22. The valve 22 is also adapted to be connected to the pump discharge conduit 16 and is adapted to regulate the pressure in the conduit 16 by venting or dumping water through a valve discharge line 24 when the flow through the valve 20 is being throttled or completely shutoff. Basically, the pressure regulator valve 22 is adapted to maintain a substantially constant discharge pressure in the conduit 16 so that pressure variations do not occur at the guns 14 when in use and, particularly, if more than one gun is being used at the same time. The regulation of pressure to minimize the variation in pressure between the valve opening and operating condition is particularly advantageous in hydraulic jet blast cleaning or cutting systems as well as many other hydraulic systems including hydrostatic test equipment used for testing components such as piping, pressure vessels and other pressure fluid devices.

Figure 2:
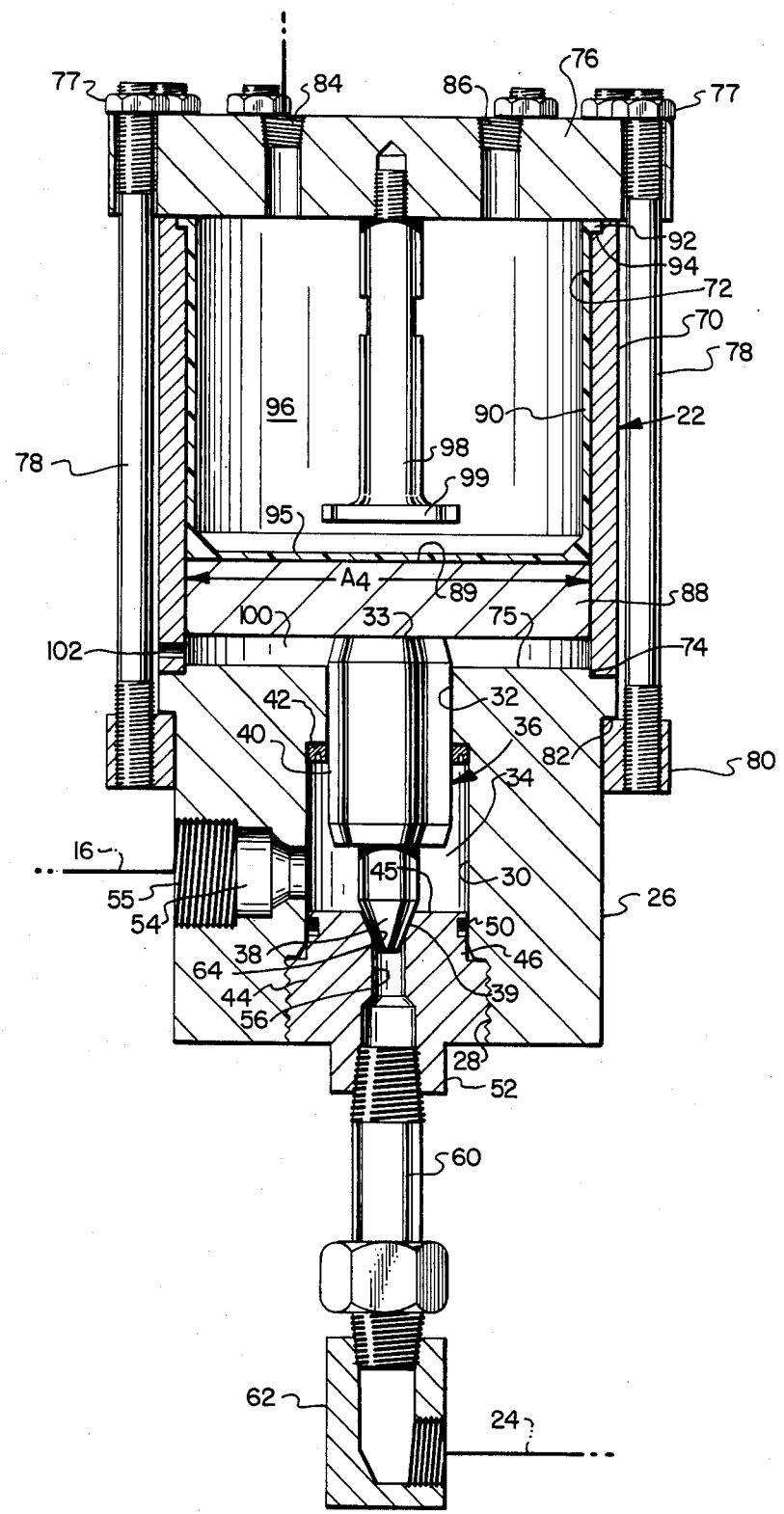
FIG. 2 is a longitudinal central section view of the pressure regulating valve.

Referring now to FIG. 2, the valve 22 is shown in a longitudinal central section view which illustrates all of the essential components of the valve. The valve 22 includes a generally cylindrical body member 26 having a longitudinal stepped bore formed therein having a threaded portion 28, a slightly smaller diameter portion 30 and a second coaxial and smaller diameter portion 32. The bore 30 defines, in part, a flow chamber 34 in which is disposed a plug type closure member 36 having a frusto-conical shaped head portion 38. The closure member 36 is preferably formed integral with a control or operating piston portion 40 which is slidably disposed in the bore 32 and is in sealing engagement with an annular seal member, generally designated by the numeral 42. The seal member 42 may be of a type commercially available and is adapted to seal against the outside diameter of the piston 40 as well as form a seal between the bores 30 and 32. One source of the type of seal illustrated is Fluorocarbon Company, Los Alamitos, Calif.

The body 26 is adapted to receive a valve seat member, generally designated by the numeral 44, which is provided with external threads cooperable with the threaded portion 28. The seat 44 also includes a reduced diameter portion 46 extending into the bore 30 and being provided with a circumferential groove for receiving groove a suitable seal such as an o-ring or the like 50. The seal provided by the o-ring 50 is advantageously disposed between the flow chamber 34 and the cooperating threads on the seat member and the body 26 whereby high pressure fluid cannot be forced between the cooperating threads. The seat 44 also includes a head portion 52 which may be provided with suitable opposed flats or other means for receiving a wrench, not shown, for removing the seat from the body 26.

The body 26 includes an inlet conduit or passage portion 54 which is adapted to include a suitable threaded portion 55 for receiving a conduit fitting, not shown, for connecting the valve 22 to the pump discharge conduit 16 or other source of high pressure fluid. The seat 44 also includes a discharge flow passage 56 including a threaded portion formed in the head 52 to which a suitable fitting such as a relatively short pipe nipple 60 may be connected. A right angle fitting 62 is also suitably connected to the conduit portion 60 to redirect the discharge flow stream from the valve 22 through a discharge line such as the conduit 24.

Figure 3:
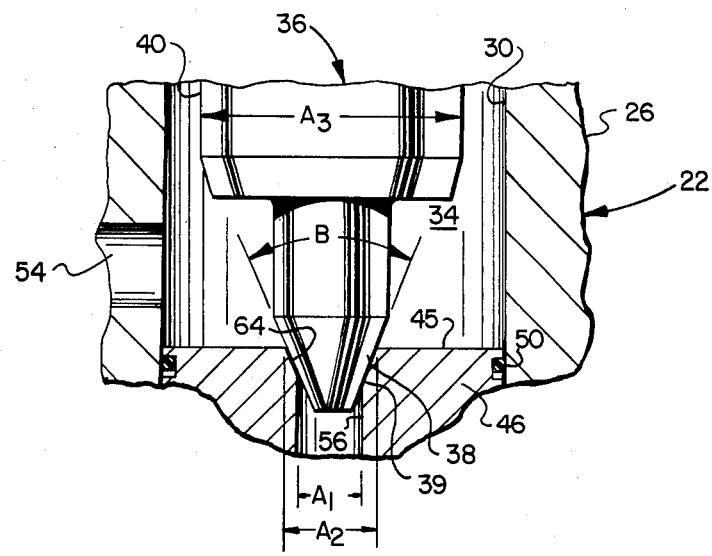
FIG. 3 is a large scale detail view of the valve closure member and valve seat.

In the development of a high pressure regulator valve for applications such as dumping or discharging substantially all of the output of a source of high pressure liquid the design criteria for the valve includes the sizing of the discharge passage 56 to be adequate such that a negligible pressure drop occurs through the passage when the valve is in the maximum open position. For example, for a valve adapted to operate between 10,000 and 20,000 psig inlet pressure in the passage 54 a 100 to 200 psig pressure drop through the passage 56 is considered negligible. Accordingly, once the flow area of the passage 56 has been determined it is then desirable to maximize the surface area of the valve seat surface which is designated by the numeral 64 in FIGS. 2 and 3. The valve seat surface 64 is formed as a frusto-conical surface delimited by the seat end wall 45 and the passage 56 and adapted to accommodate and be in sealing engagement with a cooperable seating surface 39 formed on the head 38 of the closure member 36.

It has been determined that it is desirable to maximize the actual surface area of the seating surface 64 while at the same time providing a circular axial projected or cross-sectional area $A_2$, measured at the point of intersection of the seating surface with the wall 45 which is not substantially greater than an axial projected area $A_1$, measured at the point of intersection of the surface 64 with the passage 56. At the same time it is important that the cone or included angle B of the conical surfaces 64 and 39 be such that the closure member 36 will not be self-locking in the closed position under the urging of an actuating or biasing force acting on the closure member.

In the selection of a valve for regulating pressures in the range of 10,000 to 20,000 psi and capable of discharging flow rates up to fifty gallons per minute, for example, it is also desirable to maximize the axial projected cross-sectional area $A_3$ of the control piston 40 so that the pressure required to open the valve is not substantially greater than the steady state operating or regulated pressure. Since the force required to open the valve is the pressure in the chamber 34 multiplied by the difference between the areas $A_3$ and $A_2$ and the force required to maintain the valve open is assumed to be the pressure in chamber 34 multiplied by the difference between the area $A_3$ and $A_1$ minimization of the variation in the pressures between the valve open and closed positions may be obtained also by increasing the diameter of the control piston 40. However, there are practical limitations to the actual diameter of this component considering material costs and overall size of the valve. For a valve such as the valve 22 adapted for use with high pressure water jet cutting and blast cleaning equipment it has been determined that a variation in opening pressure and operating pressure of five to ten percent is acceptable. Moreover, it has also been determined that, in using hardened stainless steel components for the valve closure member 36 and the seat 44, an included angle B of the conical surfaces 39 and 64 of between 30° and 44° will allow the closure member to move freely off of the seat surface under the urging of pressure fluid at a design opening pressure of between 10,000 psig and 20,000 psig. This is a particularly important consideration in view of the fact that the force biasing the closure member in the closed position for a valve such as the valve 22 must be substantial when considering the operating pressures and the size of the valve required for typical flow volumes used in water jet cutting and cleaning operations.

The valve 22 is provided with an improved actuating mechanism for biasing the closure member 36 toward the closed position and for controlling the fluid pressure regulated by the valve. The actuating mechanism for the valve 22 includes a cylindrical piston type actuator which is disposed in an actuator housing comprising a cylinder member 70 characterized by a cylindrical steel tube having a bore 72. The cylinder 70 is located on the valve body 26 by a shoulder 74 machined into the end face 75 of the valve body and is retained in engagement with the valve body by a head member 76 and a plurality of elongated threaded tie rods 78. The tie rods 78 preferably comprise stud members which are threadedly engaged with a cylindrical collar 80 which is sleeved over the outer cylindrical surface 27 of the body 26 and butted against a transverse shoulder 82 opposite the shoulder 74. The head member 76 comprises a relatively heavy steel plate including one or more threaded passages such as the passages 84 and 86 formed therein. The head member 76 is retained in assembly with the cylinder 70 and body 26 by nuts 77 threadedly engaged with the tie rods 78.

The actuating mechanism for the valve 22 includes a cylindrical piston 88 disposed in the bore 72 and free to float or reciprocate in the bore and to engage a transverse end face 33 of the control piston 40. The piston 88 is also engaged with an elastomeric cup shaped diaphragm, generally designated by the numeral 90 disposed in the cylinder bore 72. The diaphragm 90 includes an annular rim portion 92 which is adapted to fit in a cylindrical recess 94 formed in the end face of the cylinder tube 70 and to be engaged by the head member 76 to form a fluid tight seal between the diaphragm, the head member and the cylinder tube 70. The diaphragm 90 includes a transverse end wall 95 opposite the flange 92 and engageable with a surface 89 on the piston 88. The diaphragm 90 is dimensioned to be in slidable but snug fitting relationship within the bore 72 and is provided to form a fluid tight seal for a pressure fluid chamber defined by the diaphragm and the head member 76, and generally designated by the numeral 96. A stop member 98 is disposed in the chamber 96 and is threadedly secured to the head member 76 as shown. The stop member 98 includes a cylindrical head portion 99 which is dimensioned to be positioned a short distance from the diaphragm end wall 95 in accordance with the operating characteristics of the valve 22. A chamber portion 100 between the piston 88 and the end face 75 of the body 26 is vented to atmosphere through a passage 102.

The control pressure at which the closure member 36 opens and regulates the pressure in the line 16 is determined by the pressure of fluid introduced into the chamber 96 and by the axial projected or cross-sectional surface area $A_4$ of the piston 88, FIG. 2, neglecting the sidewall thickness of the diaphragm 90. A preferred ratio of the areas $A_4$ to $A_3$ is approximately 10:1 and, accordingly, for a valve adapted to regulate the pressure in conduit 16 at 10,000 psi the chamber 96 is required to be charged with pressure fluid at a pressure of 1,000 psi. The chamber 96 may receive an initial charge of pressure fluid such as an inert gas at the desired pressure through the passage 84 which may be in communication with a conduit 104 having a constant pressure regulator valve 106 disposed therein and in communication with a source of pressure gas such as a tank 108. A suitable gas for use in the actuator of the valve 22 would be compressed air or nitrogen, for example. Although the chamber 96 may be initially charged with pressure gas at the desired pressure and cut off from the source such as the tank 108 it might be preferred in some applications to maintain a source of additional pressure gas onboard or in proximity to the valve 22 and controlled by a regulator such as the regulator 106. The passage 86 is provided for connecting the chamber 96 to a pressure guage or indicator, not shown and would, of course, otherwise be plugged prior to charging the chamber 96.

Although, in accordance with the present invention, the valve 22 is adapted to minimize the difference between the pressure required to open the valve and the pressure which is continuously regulated by the valve in a steady state condition, there is a net difference in these pressures as discussed previously herein. However, the actuator mechanism for the valve 22 is also adapted to minimize such pressure differences by providing the chamber 96 to be maintained at a minimum charge pressure by a regulator such as the regulator 106. However, the regulator 106 can be of a type which will allow the pressure to increase above the set point in the chamber 96 and, of course, this may occur upon movement of the piston 88 to decrease the volume of the chamber. Upon movement of the closure member 36 from the closed position to the open position there is a net reduction in the volume of the chamber 96 as the piston 88 displaces or compresses the diaphragm 90. The volume of the chamber 96 can be determined to be such that at maximum displacement of the piston 36, as determined by the stop member 98, the change in volume of the chamber 96 will result in an increase in gas pressure in the chamber 96 providing a force acting on the piston 88 which will be balanced by the force acting on the closure member 36 due to the regulated pressure in chamber 34 multiplied by the difference between the area $A_3$ and $A_1$. Accordingly, the tendency for the valve 22 to operate at a regulated pressure in the conduit 16 less than the pressure required to open the valve is offset by an increase in the effective closing force of the actuator tending to move the closure member 36 toward the valve closed position. This action further minimizes the difference between the pressure required to open the valve and the pressure controlled by the valve on a steady state basis.

The operation of the valve 22 is believed to be evident from the foregoing description. As illustrated in FIG. 1 the valve is preferably connected in parallel with the working fluid flow line or conduit 16 leading from the pump 10 to one or more water blast guns such as the gun 14. In use the valve 22 may be provided with a source of pressure gas such as the pressure tank 108 or an initial charge of pressure fluid may be introduced into the chamber 96 and then shutoff from the source. Thanks to the structural features of the valve 22 which provide for minimum variation between the valve opening pressure and the constant regulated pressure one or several jet guns 14 may be operated from the same pump discharge line 16 and the working pressure of the guns may be adjusted by setting the pressure in the chamber 96.

Although the construction of the valve 22 is such as to minimize the need for replacement or repair, the uncomplicated structural features of the valve facilitate ease of repair and/or replacement of the valve seat member 44 and the closure member 36, for example. The closure member 36 may, in fact, be replaced without disassembly of the actuator portion of the valve by simply removing the seat member 44 and allowing the closure member and the integral control piston 40 to be dropped or easily pulled out of the chamber 34. The diaphragm 90 is a longlife element and does not undergo severe cyclical distentions. In fact, for a valve sized to regulate a maximum of fifty gallons per minute of pump discharge flow, the diameter of the piston 88 may be a nominal 5.65 inches, the diameter of the control piston 40 may be a nominal 1.75 inches and the diameter of the discharge conduit 56 a nominal 0.45 inches. For a valve sized in accordance with the above described dimensions and a minimum pressure drop across the seat discharge passage of approximately 120 to 150 psig, the piston 88 will normally undergo movement of a maximum of 0.020 inches. Accordingly, this limited movement will not result in severe distention or compressing of the diaphragm 90.

Those skilled in the art will appreciate from the foregoing description that the valve 22 is mechanically uncomplicated and yet is provided with improved operating characteristics which are particularly desirable for applications in regulating pressures in relatively high pressure hydraulic applications. Moreover, various substitutions and modifications may be made to the specific structural features of the valve described herein without departing from the scope and spirit of the invention which is defined by the appended claims.

What I claim is:

1. A pressure regulating valve for regulating relatively high hydraulic fluid pressures in the range of at least 10,000 psig to 20,000 psig in a fluid supply conduit of a hydraulic jet blasting system to minimize pressure variation in said conduit resulting from changes in hydraulic fluid flow through said system, said regulating valve comprising a body having a first bore defining a flow chamber, an inlet passage in communication with said flow chamber and adapted to be connected to said conduit, valve seat means comprising a seat member member threadedly engaged with a cooperating threaded portion of said body forming a second bore, said seat member having an outlet passage opening into said flow chamber and having a portion forming a frusto-conical seating surface having an enlarged diameter first end adjacent said flow chamber and a reduced diameter second end adjacent said outlet passage, a valve closure member disposed in said flow chamber and including a frusto-conical closure member portion engageable with said seating surface and retained in said body by said seat member, a relatively large diameter cylindrical control piston connected to said closure member and including a portion slidably disposed in a third bore in said body, seal means cooperable with said body and said control piston to prevent leakage of fluid out of said flow chamber through said third bore, actuating means including actuating cylinder means forming a fourth bore and piston means disposed in said fourth bore and engaged with but not secured to said control piston for urging said control piston toward a valve closed position of said closure member, said control piston, said closure member and said body being constructed such that said control piston and said closure member can be removed from said body through said first bore and said second bore by removing said seat member without permitting removal of said piston means from said body through said first bore, said valve being configured such that when said said closure member is fully open the pressure drop between said flow chamber and said outlet occurs in the region between said closure member and said seating surface, said control piston being configured such that a first effective cross-sectional area is exposed to fluid pressure in said flow chamber when said closure member portion is engaged with said seating surface and responsive to said fluid pressure to urge said closure member to move away from said seating surface, said first effective area being equal to the area of said control piston less the area of said first end of said seating surface, said closure member portion engageable with said seating suface being configured such that a second effective cross-sectional area of said control piston is exposed to fluid pressure in said flow chamber upon movement of said closure member to the valve open position, said second effective area being equal to the area of said control piston less the area of said second end of said seating surface, and the difference between said first and second effective cross-sectional areas is such as to provide a variation between valve opening pressure and valve operating pressure in said flow chamber of no more than five to ten percent of said valve opening pressure.

2. The valve set forth in claim 1 wherein: the included angle of said conical portions of said closure member and seating surface being in the range of approximately 30° to 45° to prevent said closure member from locking engagement with said seat means.

3. The valve set forth in claim 1 wherein:
said actuating means comprises a pressure fluid cylinder, an actuating piston disposed in said cylinder, and a flexible cup shaped diaphragm disposed in said cylinder and engaged with said actuating piston and defining a pressure fluid chamber for storing fluid under pressure to act on said actuating piston for urging said control piston to move said closure member to the valve closed position.

4. The valve set forth in claim 3 wherein:
said actuating piston is disposed between said diaphragm and said control piston.

5. The valve set forth in claim 1 and further including:
an annular seal member disposed in said bore defining said flow chamber and in sealing engagement with said control piston and with the bore wall of said flow chamber to isolate said flow chamber from said actuating means.

6. A valve adapted for regulating relatively high hydraulic fluid pressures in a conduit, said pressures being in the range of at least 10,000 to 20,000 psig, said valve including:
a body having a first cylindrical bore defining a flow chamber and an inlet passage in said body opening into said flow chamber;
a seat member adapted to be releasably secured to said body and closing one end of said first bore, said seat member including a seating surface facing said flow chamber, and an outlet passage formed in said seat member downstream of said seating surface;
a plug type closure member adapted to be disposed in said first bore and including a portion engageable with said seating surface, said closure member including a control piston slidably disposed in a second bore in said body coaxial with said first bore;
a valve actuator connected to said body including means for providing a substantial biasing force acting on said control piston, said actuator including a pressure fluid cylinder, an actuating piston disposed in said cylinder and engaged with said control piston, and a flexible diaphragm disposed in said cylinder and engaged with said activating piston and defining a pressure fluid chamber for storing fluid under pressure to act on said actuating piston to provide a substantial biasing force for urging said control piston toward said seating surface to move said closure member to the valve closed position, said cylinder including a removable head member and a cylinder member joined in sealing engagement, said head member being joined in assembly with said cylinder member and said body by a plurality of elongated tie rods engaged at one end with said head member and at their other end with a cylindrical ring engaged with a retaining shoulder formed on said body; and
said body and said actuator are adapted to provide for removal of said closure member including said control piston from said body upon removal of said seat member from said body and without removal of the means providing said biasing force acting on said control piston.

7. A pressure regulating valve for regulating relatively high hydraulic fluid pressures in the range of at least 10,000 psig to 20,000 psig in a fluid supply conduit of a hydraulic system to minimize pressure variations in said conduit, said regulating valve comprising a body defining a flow chamber, an inlet passage in communication with said chamber and adapted to be connected to said conduit, means forming a seat member including an outlet passage opening into said chamber and having a portion forming a frusto-conical seating surface having an enlarged diameter first end facing said flow chamber and a reduced diameter second end connected to said outlet passage, a frusto-conical valve closure member disposed in said chamber and including a closure member portion engageable with said seating surface, a relatively large diameter cylindrical control piston connected to said closure member, said valve being constructed such that when said closure member is fully open the pressure drop across said valve occurs in the region between said closure member and said seating surface, said control piston including a first effective cross-sectional area equal to the area of said control piston less the area of said first end of said seating surface exposed to fluid pressure in said chamber when said closure member portion is engaged with said seating surface and responsive to said fluid pressure to urge said closure member to move away from said seating surface, said closure member portion engageable with said seating surface being configured such that a second effective cross-sectional area of said control piston, equal to the area of said control piston less the area of said second end of said seating surface is exposed to fluid pressure in said chamber upon movement of said closure member to the valve open position, the difference between said first and second effective cross-sectional areas is such as to minimize the variation between valve opening pressure and valve operating pressure in said chamber, and actuating means for urging said control piston toward a valve closed position of said closure member, said actuating means comprising a pressure fluid cylinder, an actuating piston disposed in said cylinder, and a flexible diaphragm disposed in said cylinder and operably engaged with said actuating piston and defining a pressure fluid actuator chamber for storing fluid under pressure to act on said actuating piston for urging said control piston to move said closure member to the valve closed position, and means forming a stop member for limiting the movement of said actuating piston in a direction to permit valve opening movement of said closure member and to a position of said diaphragm such that the volume of said actuator chamber is reduced only an amount to provide a pressure increase in said actuator chamber sufficient to provide a valve closing force acting on said control piston which is substantially balanced by a valve opening force acting on said control piston.

8. A pressure regulating valve comprising:
a body defining a flow chamber, an inlet passage in communication with said chamber and adapted to be connected to a conduit, means forming a seat member including an outlet passage opening into said chamber and having a portion forming a seating surface, a valve closure member disposed in said chamber and including a closure member portion engageable with said seating surface, a control piston connected to said closure member and including a portion disposed in a bore in said body, said control piston including a first effective cross-sectional area exposed to fluid pressure in said chamber when said closure member is engaged with said seating surface and responsive to said fluid pressure to urge said closure member to move away from said seating surface, said closure member portion engageable with said seating surface being configured such that a second effective cross-sectional area of said control piston is exposed to fluid pressure in said chamber upon movement of said closure member to the valve open position and the difference between said first and second effective cross-sectional areas in such as to minimize the variation between valve opening pressure and valve operating pressure in said chamber, and actuating means for urging said control piston toward a valve closed position of said closure member, comprising a pressure fluid cylinder, an actuating piston disposed in said cylinder including means defining a pressure fluid chamber for storing fluid under pressure to act on said actuating piston for urging said control piston to move said closure member to the valve closed position, said cylinder including a removable head member and a cylinder member joined in sealing engagement and said head member is joined in assembly with said cylinder member by a plurality of elongated tie rods engaged at one end with said head member and at their other end with a cylindrical ring engaged with a retaining shoulder formed on said body.

9. The valve set forth in claim 8 wherein:

said means defining said actuator chamber includes a flexible cup-shaped diaphragm disposed in said cylinder and engaged with said actuating piston.

10. The valve set forth in claim 8 including a stop member disposed in said actuator chamber for limiting the movement of said actuating piston in a direction to permit valve opening movement of said closure member whereby the volume of said actuator chamber is reduced only an amount to provide a pressure increase in said actuator chamber sufficient to provide a valve closing force acting on said control piston which is substantially balanced by a valve opening force acting on said control piston.

* * * * *